(12) United States Patent
Lai

(10) Patent No.: US 11,714,777 B2
(45) Date of Patent: Aug. 1, 2023

(54) METHOD FOR PERFORMING DATA TRANSMISSION CONTROL OF INTER FIELD PROGRAMMABLE GATE ARRAYS AND ASSOCIATED APPARATUS

(71) Applicant: Realtek Semiconductor Corp., HsinChu (TW)

(72) Inventor: Chi-Shao Lai, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 60 days.

(21) Appl. No.: 17/528,125

(22) Filed: Nov. 16, 2021

(65) Prior Publication Data

US 2022/0309020 A1  Sep. 29, 2022

(30) Foreign Application Priority Data

Mar. 29, 2021 (TW) ................................. 110111366

(51) Int. Cl.
*G06F 13/16* (2006.01)
*G06F 13/42* (2006.01)
*G06F 13/362* (2006.01)

(52) U.S. Cl.
CPC ...... *G06F 13/4273* (2013.01); *G06F 13/1621* (2013.01); *G06F 13/3625* (2013.01)

(58) Field of Classification Search
CPC ............. G06F 13/4273; G06F 13/1621; G06F 13/3625; G06F 13/4027; G06F 13/4022
See application file for complete search history.

(56) References Cited

U.S. PATENT DOCUMENTS

| 11,586,572 B2 * | 2/2023 | Yang | ................... G06F 13/4022 |
| 2005/0256969 A1 | 11/2005 | Yancey | |
| 2008/0092001 A1 | 4/2008 | Kodavalla | |
| 2010/0157854 A1 * | 6/2010 | Anderson | ............... H04L 49/10 370/470 |
| 2013/0021059 A1 * | 1/2013 | Singh | ............... H03K 19/17744 326/39 |
| 2013/0170525 A1 * | 7/2013 | Asaad | ................... G06F 30/331 375/219 |

FOREIGN PATENT DOCUMENTS

CN           101242395 A        8/2008

OTHER PUBLICATIONS

Ed McGettigan, Kavitha Nagarajan, "LVDS Source Synchronous 7:1 Serialization and Deserialization Using Clock Multiplication", Apr. 15, 2017, Xinlinx, USA.

* cited by examiner

*Primary Examiner* — Raymond N Phan

(74) *Attorney, Agent, or Firm* — Winston Hsu

(57) ABSTRACT

A method for data transmission control of inter field programmable gate array (FPGA) and an associated apparatus are provided. The method includes: utilizing a first register device to latch a set of data from a first FPGA according to a first clock, wherein the set of data is arranged and divided into multiple sets of partial data according to attributes of payloads and pointers; utilizing a time-division multiplexing (TDM) interface to transmit the multiple sets of partial data from the first register device to a second register device according to a TDM clock at multiple time points, respectively; and utilizing the second register device to sequentially receive the multiple sets of partial data, in order to output the set of data to a second FPGA, wherein the second FPGA operates according to a second clock different from the first clock.

18 Claims, 8 Drawing Sheets

METHOD FOR PERFORMING DATA TRANSMISSION CONTROL OF INTER FIELD PROGRAMMABLE GATE ARRAYS AND ASSOCIATED APPARATUS

BACKGROUND OF THE INVENTION

1. Field of the Invention

The present invention is related to high speed communications of inter devices, and more particularly, to a method for performing data transmission control of inter field programmable gate arrays (FPGAs), and an associated apparatus.

2. Description of the Prior Art

Field programmable gate arrays (FPGAs) are widely utilized in system development. For some types of systems, hardware of one FPGA might be insufficient. Thus, multiple connected FPGAs respectively perform the roles of different partitions in a system in order to perform prototyping design and emulation for the whole system. Typically, thousands of Inputs/Outputs (IOs) are available. In a complex system, signal transmission widths between different partitions may reach tens of thousands of bits. The number of IOs of the FPGA therefore becomes a limitation during the development process. In addition, these interconnected FPGAs need to accommodate each other's frequency, making it hard for them to operate under their own optimized frequencies, thereby restricting an overall performance.

Thus, there is a need for a novel data transmission control method and an associated apparatus, in order to perform inter FPGAs data transmission under a condition where the number of IOs of each FPGA is limited, while allowing all FPGAs to operate under their own optimized frequencies.

SUMMARY OF THE INVENTION

An objective of the present invention is to provide a method for performing data transmission control of inter field programmable gate arrays (FPGAs), and an associated apparatus, to allow different FPGAs to operate under their own optimized frequencies.

At least one embodiment of the present invention provides a method for performing data transmission control of inter FPGAs. The method comprises: utilizing a first register device to latch a set of data from a first FPGA according to a first clock, wherein the set of data is sorted and divided into multiple sets of partial data according to attributes of payloads and pointers; utilizing a time-division multiplexing (TDM) interface to transmit the multiple sets of partial data from the first register device to a second register device according to a TDM clock at multiple time points, respectively; and utilizing the second register device to sequentially receive the multiple sets of partial data, in order to output the set of data to a second FPGA, wherein the second FPGA operates according to a second clock different from the first clock.

At least one embodiment of the present invention provides an apparatus for performing emulation of an electronic system. The apparatus comprises a first FPGA, a second FPGA, a first register device, a second register and a TDM interface. The first register device is coupled to the first FPGA, and the second register device is coupled to the second FPGA, wherein the TDM interface is coupled between the first register device and the second register device. The first FPGA is configured to perform emulation of a first sub-system of the electronic system, wherein the first FPGA operates according to a first clock. The second FPGA is configured to perform emulation of a second sub-system of the electronic system, wherein the second FPGA operates according to a second clock different from the first clock. More particularly, the first register device latches a set of data from the first FPGA according to the first clock, wherein the set of data is sorted and divided into multiple sets of partial data according to attributes of payloads and pointers, to allow the TDM interface to transmit the multiple sets of partial data from the first register device to the second register device according to a TDM clock at multiple time points, respectively. In addition, the second register device sequentially receives the multiple sets of partial data, in order to output the set of data to the second FPGA.

The method and the apparatus provided by the embodiments of the present invention can completely separate clock domains of the first FPGA and the second FPGA by an asynchronous interface with the aid of sorting according to attributes of payloads and pointers. The first FPGA and the second FPGA are therefore both able to operate under their own optimized frequencies. The embodiments of the present invention will not greatly increase overall additional costs. Thus, the present invention can solve the problem of the related art without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
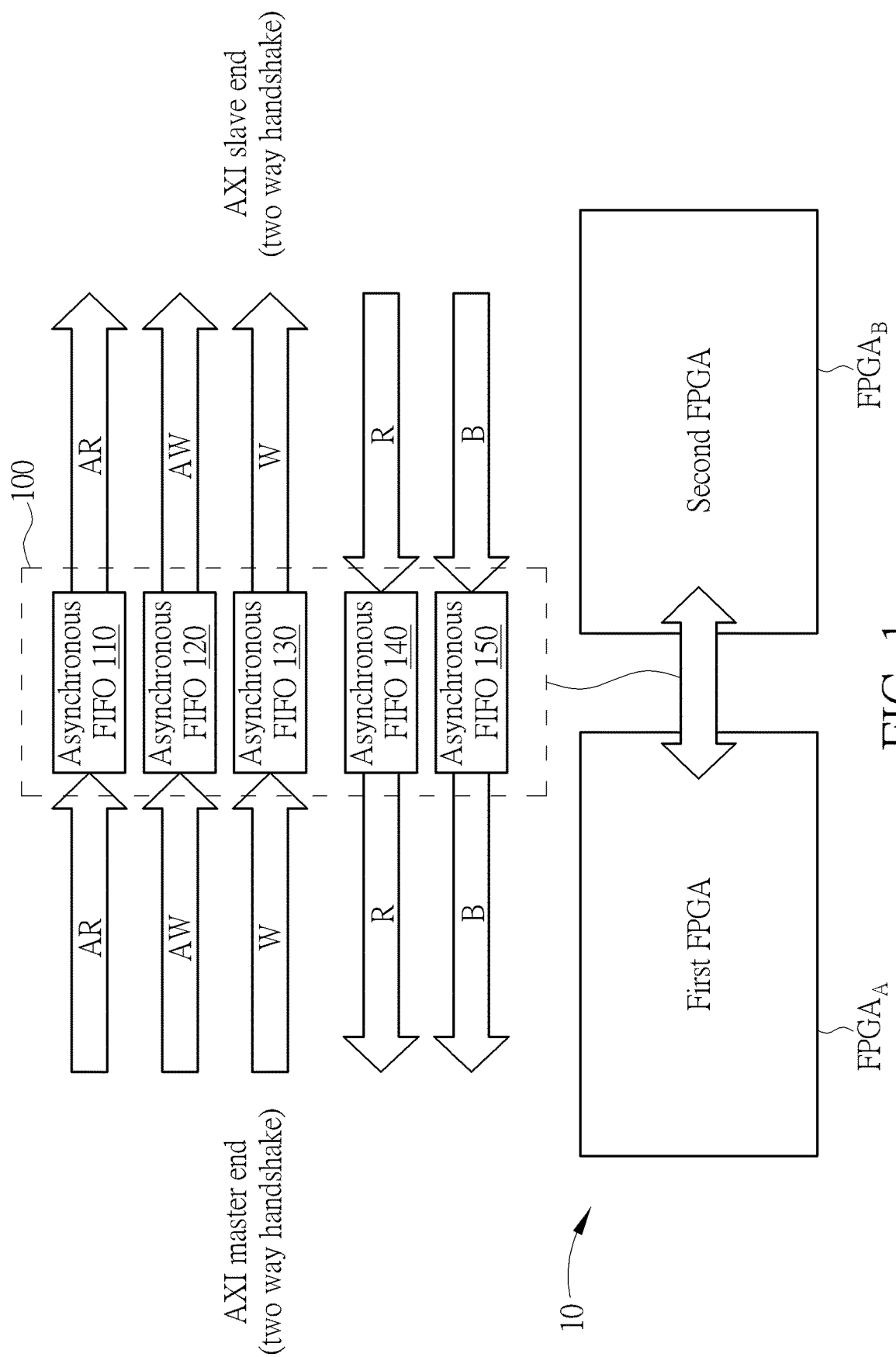
FIG. 1 is a diagram illustrating an apparatus for performing emulation of an electronic system according to an embodiment of the present invention.

FIG. 1 is a diagram illustrating an apparatus 10 for performing emulation of an electronic system according to an embodiment of the present invention. The apparatus 10 may comprise a first field programmable gate array (FPGA) $FPGA_A$ and a second FPGA $FPGA_B$. In this embodiment, the first FPGA $FPGA_A$ may be configured to perform emulation of a first sub-system of the electronic system, and the second FPGA $FPGA_B$ may be configured to perform emulation of a second sub-system of the electronic system, where the first FPGA $FPGA_A$ operates according to a first clock and the second FPGA $FPGA_B$ operates according to a second clock different from the first clock. The first FPGA $FPGA_A$ and the second FPGA $FPGA_B$ may be implemented by FPGAs of a certain manufacturer such as Xilinx, but the present invention is not limited thereto.

As shown in FIG. 1, the first FPGA $FPGA_A$ may be connected with the second FPGA $FPGA_B$ via a connecting device 10, where the connecting device 10 may conform to an Advanced eXtensible Interface (AXI) bus protocol, but the present invention is not limited thereto. In this embodiment, the first FPGA $FPGA_A$ may act as a master device, where one end of the connecting device 10 which is connected to the first FPGA $FPGA_A$ may act as an AXI master end; and the second FPGA $FPGA_B$ may act as a slave device, where the other end of the connecting device 10 which is connected to the second FPGA $FPGA_B$ may act as an AXI slave end. The connecting device 10 can perform a two way handshake with the first FPGA $FPGA_A$ at the AXI master end, and the connecting device 10 can perform a two way handshake with the first FPGA $FPGA_A$ at the AXI master end, but the present invention is not limited thereto.

As shown in FIG. 1, data transmission between the first FPGA $FPGA_A$ and the second FPGA $FPGA_B$ may comprise multiple channel types. For example, channels specified in the AXI bus protocol may comprise an address read (AR) channel, an address write (AW) channel, a write (W) channel, a read (R) channel and a response (B) channel. In this embodiment, the connecting device 10 may comprise multiple asynchronous First In First Out (FIFO) registers (referred to as "asynchronous FIFOs" for brevity) such as asynchronous FIFOs 110, 120, 130 140 and 150 for the multiple channel types mentioned above.

Figure 2:
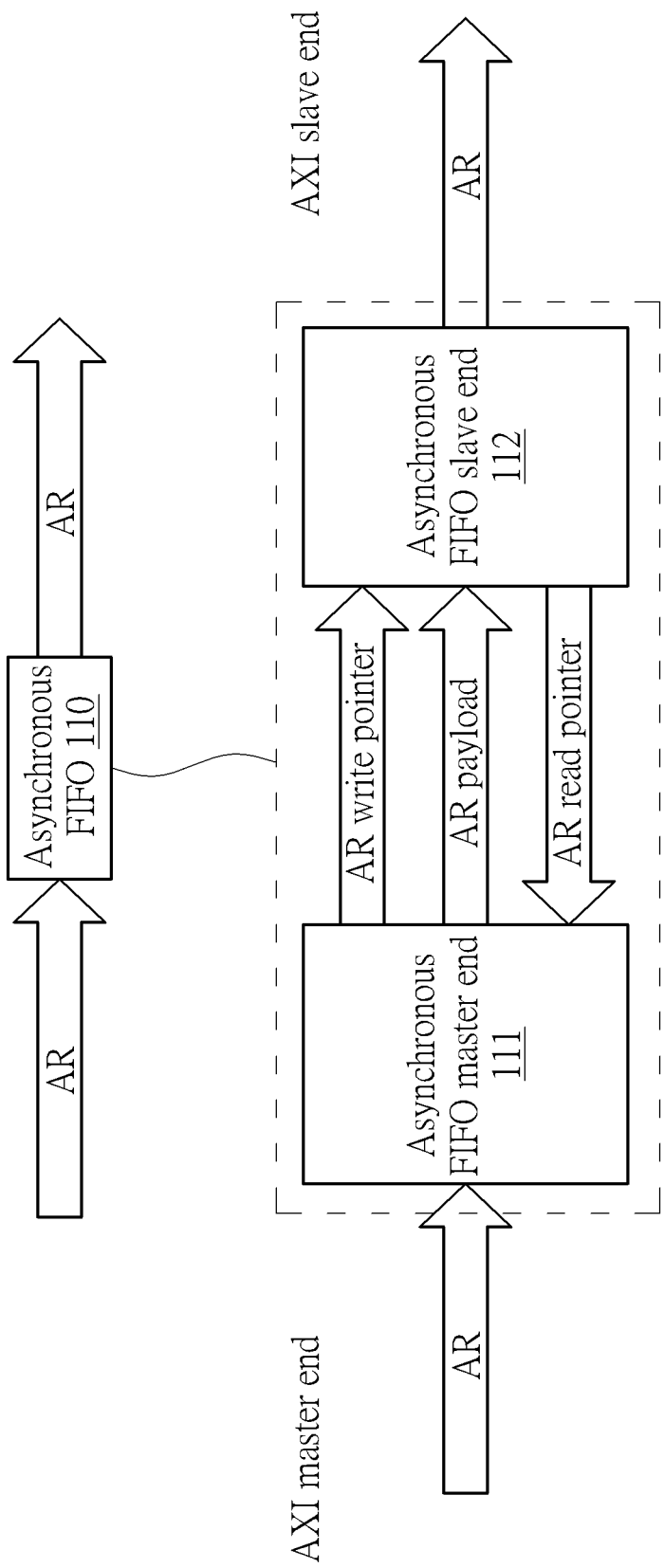
FIG. 2 is an example of a First In First Out (FIFO) register corresponding to a certain type of channel.

In this embodiment, each channel type of the channel types mentioned above may comprise transmission of data in two directions. FIG. 2 takes the asynchronous FIFO 110 corresponding to the AR channel as an example, where the FIFO 110 may receive related data/commands of the AR channel from the AXI master end and transmit the related data/commands of the AR channel to the AXI slave end in the manner of a FIFO. As shown in FIG. 2, the asynchronous FIFO 110 may comprise an asynchronous FIFO master end 111 (which may be a register file comprising multiple registers) and an asynchronous FIFO slave end 112 (which may be multiple multiplexers), where the related data/commands of the AR channel are received from the AXI master end via the asynchronous FIFO master end 111 and are then transmitted to the AXI slave end via the asynchronous FIFO slave end 112. In this embodiment, communication between the asynchronous FIFO master end 111 and the asynchronous FIFO slave end 112 may comprise transmission of data in two directions, where the transmission of data in a first direction may comprise an AR write pointer and an AR payload (e.g., data payload) transmitted from the asynchronous FIFO master end 111 to the asynchronous FIFO slave end 112, and the transmission of data in a second direction may comprise an AR read pointer transmitted from the asynchronous FIFO slave end 112 to the asynchronous FIFO master end 111.

Figure 3:
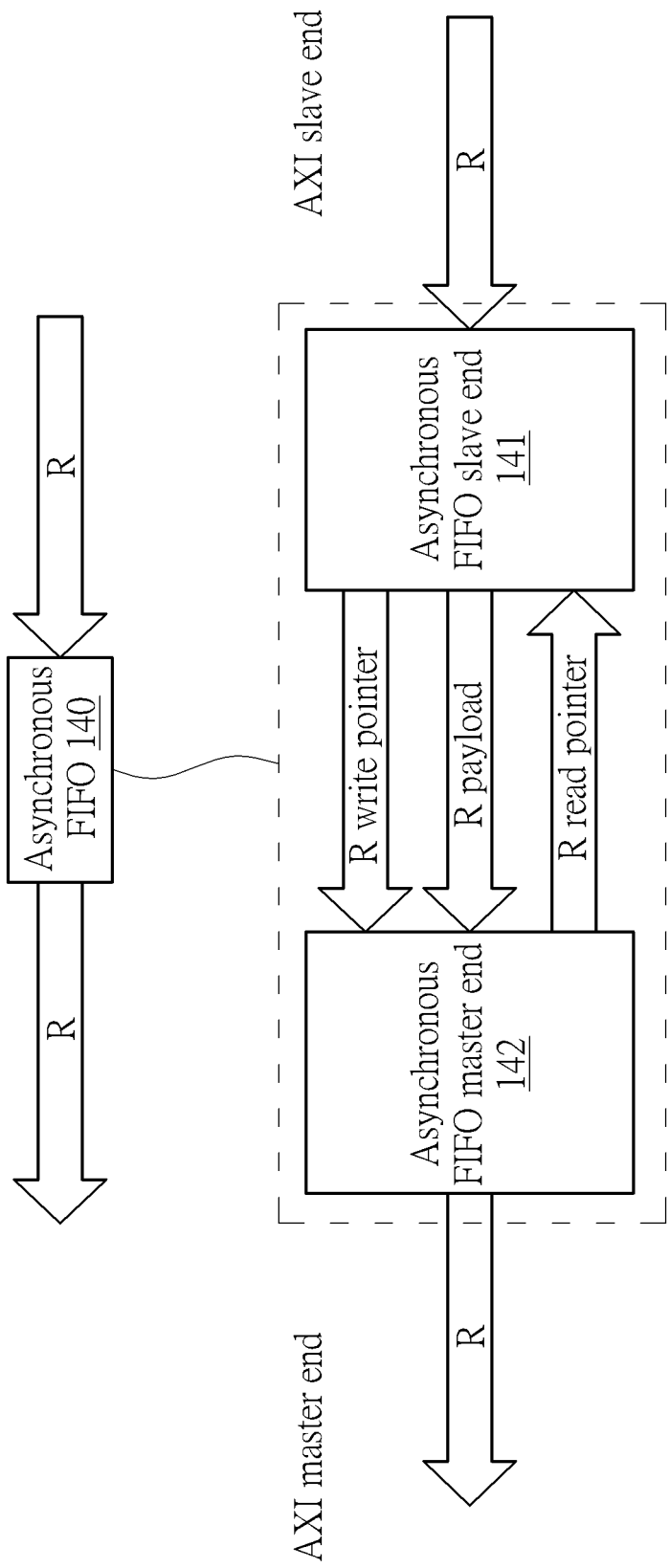
FIG. 3 is an example of a FIFO register corresponding to another type of channel.

FIG. 3 takes the asynchronous FIFO 140 corresponding to the R channel as an example, where the asynchronous FIFO 140 may receive related data/commands of the R channel from the AXI slave end and transmit the data/commands to the AXI master end in the manner of a FIFO. As shown in FIG. 3, the asynchronous FIFO 140 may comprise an asynchronous FIFO master end 141 (which may be a register file comprising multiple registers) and an asynchronous FIFO slave end 142 (which may be multiple multiplexers), where the related data/commands of the R channel are received from the AXI slave end via the asynchronous FIFO master end 141 and are then transmitted to the AXI master end via the asynchronous FIFO slave end 142. In this embodiment, communication between the asynchronous FIFO master end 141 and the asynchronous FIFO slave end 1442 may comprise transmission of data in two directions, where the transmission of data in a first direction may comprise an R write pointer and an R payload transmitted from the asynchronous FIFO master end 141 to the asynchronous FIFO slave end 142, and the transmission of data in a second direction may comprise an R read pointer transmitted from the asynchronous FIFO slave end 142 to the asynchronous FIFO master end 141.

Based on the illustrations of FIG. 2 and FIG. 3, details of related data/commands of other channel types such as the AW channel, the W channel and the B channel may be deduced by analogy, and are therefore omitted here for brevity.

Figure 4:
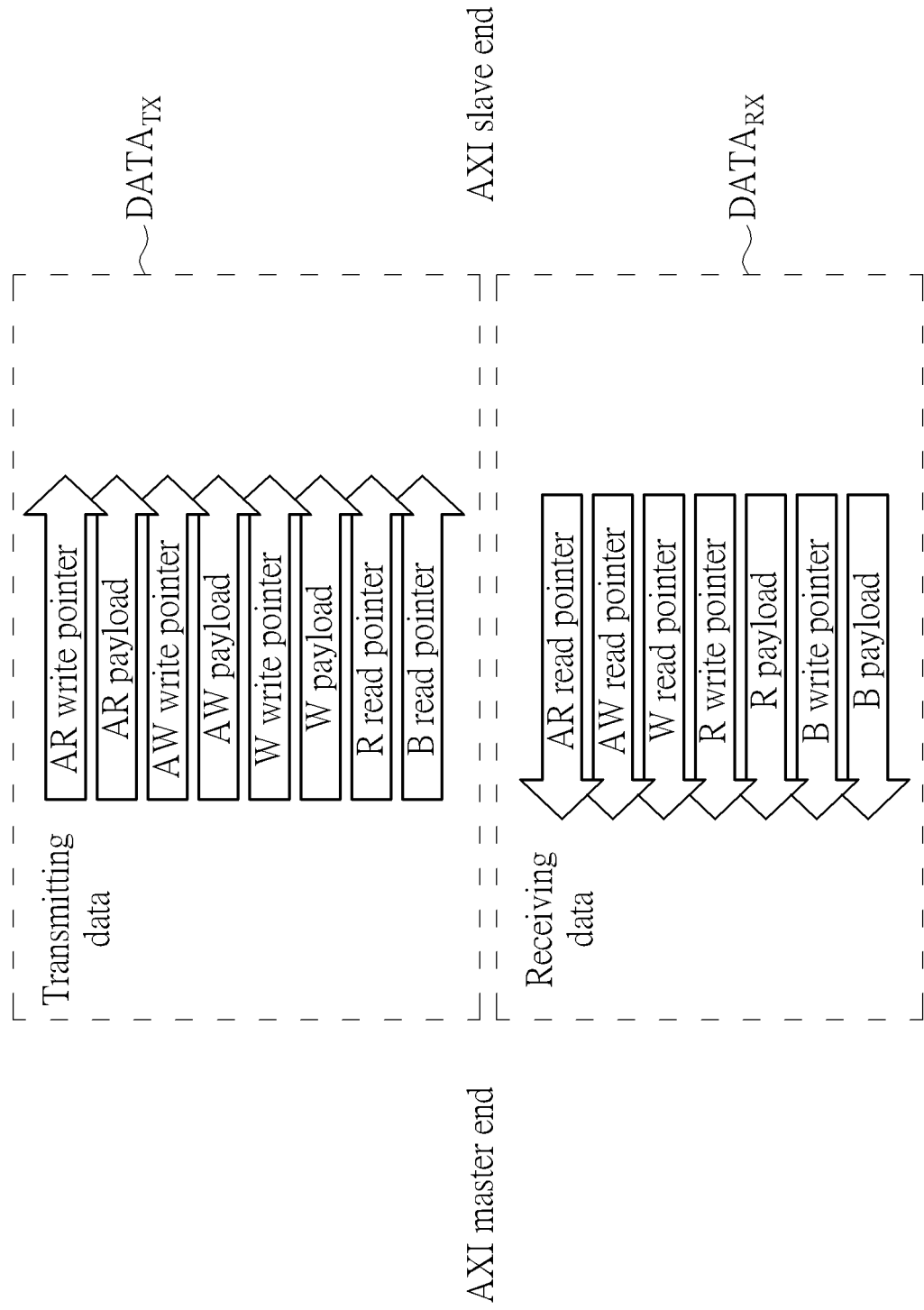
FIG. 4 illustrates sorting data of multiple channel types having the same direction to generate a set of data.
Figure 5:
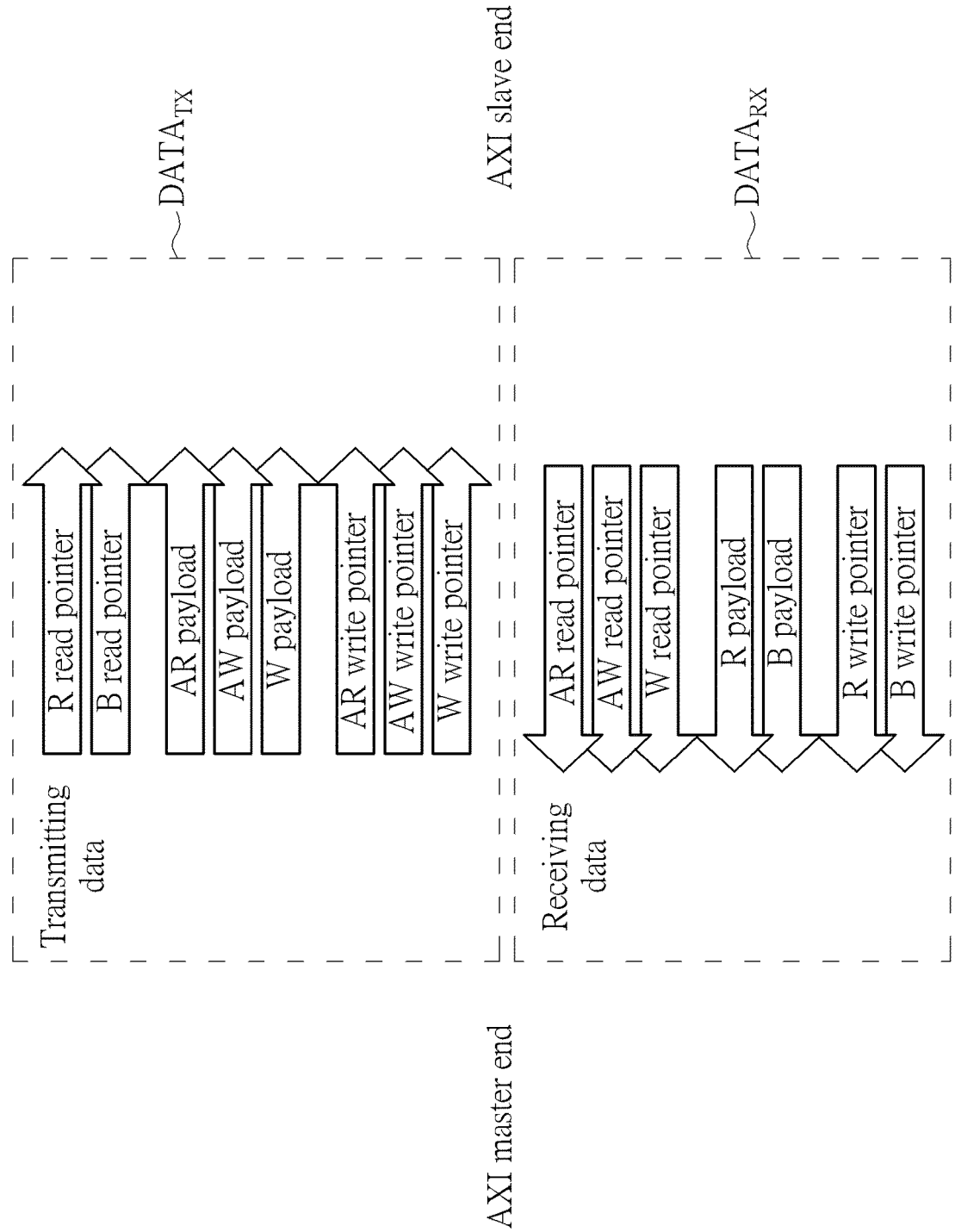
FIG. 5 illustrates further sorting data within the set of data shown in FIG. 4.

The data transmission of respective channel types between the AXI master end and the AXI slave end may comprise: data transmitted from the AXI master end to the AXI slave end regarding data attributes, for example comprising an AR write pointer, an AR payload, an AW write pointer, an AW payload, a W write pointer, a W payload, an R read pointer and a B read pointer; and data transmitted from the AXI slave end to the AXI master end regarding the data attributes, for example comprising an AR read pointer, an AW read pointer, a W read pointer, an R write pointer, an R payload, a B write pointer and a B payload. As shown in FIG. 4, in the multiple channel types, data in the same data transmission direction (e.g., transmitted from the AXI master end to the AXI slave end, or transmitted from the AXI slave end to the AXI master end) can be sorted together to generate a set of data. For example, the AXI master end may sort the AR write pointer, the AR payload, the AW write pointer, the AW payload, the W write pointer, the W payload, the R read pointer and the B read pointer together to generate a set of transmitting data $DATA_{TX}$, and the AXI slave end may sort the AR read pointer, the AW read pointer, the W read pointer, the R write pointer, the R payload, the B write pointer and the B payload together to generate a set of receiving data $DATA_{RX}$. Thus, the set of data (e.g., the set of transmitting data $DATA_{TX}$ or the set of receiving data $DATA_{RX}$) may comprise at least one read pointer, at least one payload or at least one write pointer. It is noted that a time point of the at least one payload being transmitted from the AXI master end to the AXI slave end is preferably earlier than a time point of the at least one write pointer being transmitted from the AXI master end to the AXI slave end, and a time point of the at least one read pointer being transmitted from the AXI master end to the AXI slave end is preferably earlier than a time point of the at least one payload being transmitted from the AXI master end to the AXI slave end. Thus, in the embodiment of the present invention, the AR write pointer, the AR payload, the AW write pointer, the AW payload, the W write pointer, the W payload, the R read pointer and the B read pointer in the set of transmitting data $DATA_{TX}$ may be further sorted (e.g., to reorder the order of transmission) according to attributes of payloads and pointers, and more particularly, be sorted as the R read pointer, the B read pointer, the AR payload, the AW payload, the W payload, the AR write pointer, the AW write pointer and the W write pointer. The AR read pointer, the AW read pointer, the W read pointer, the R write pointer, the R payload, the B write pointer and the B payload in the set of transmitting data $DATA_{RX}$ may be further sorted (e.g., to reorder the order of transmission) according to the attributes of payloads and pointers, and more particularly, be sorted as the AR read pointer, the AW read pointer, the W read pointer, the R payload, the B payload, the R write pointer and the B write pointer.

Figure 6:
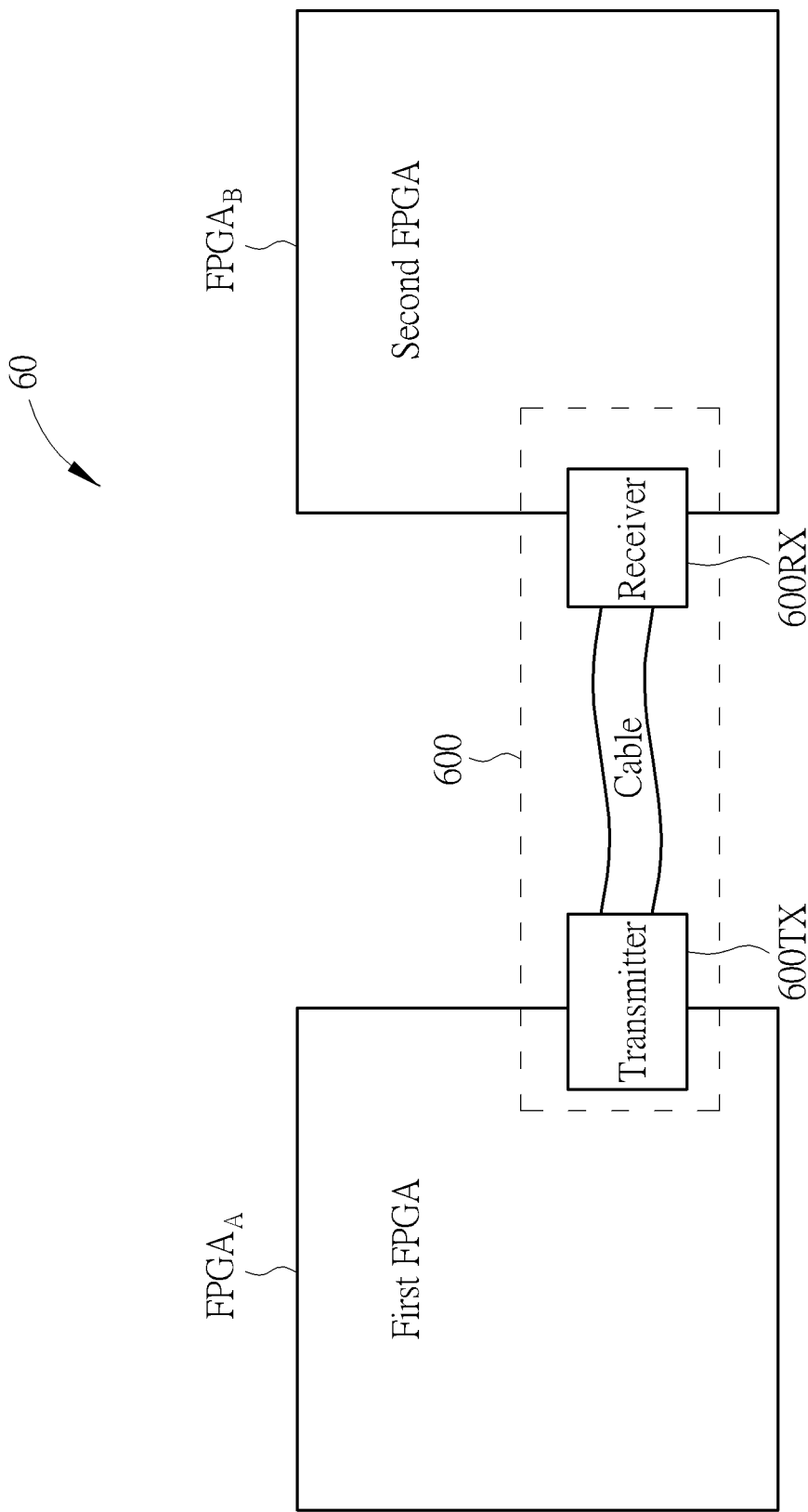
FIG. 6 is a diagram of an apparatus for performing emulation of an electronic system according to an embodiment of the present invention.

FIG. 6 is a diagram illustrating an apparatus 60 for performing emulation of an electronic system according to an embodiment of the present invention, where the apparatus 60 may be an example of the apparatus 10 shown in FIG. 1. As shown in FIG. 6, the first FPGA $FPGA_A$ and the second FPGA $FPGA_B$ may be connected to each other via a connecting device 600, where the connecting device 600 may comprise a transmitter 600TX coupled to the first FPGA $FPGA_A$ and a receiver 600RX coupled to the second FPGA $FPGA_B$, and the transmitter 600TX and the receiver 600RX may be connected to each other via a cable.

Figure 7:
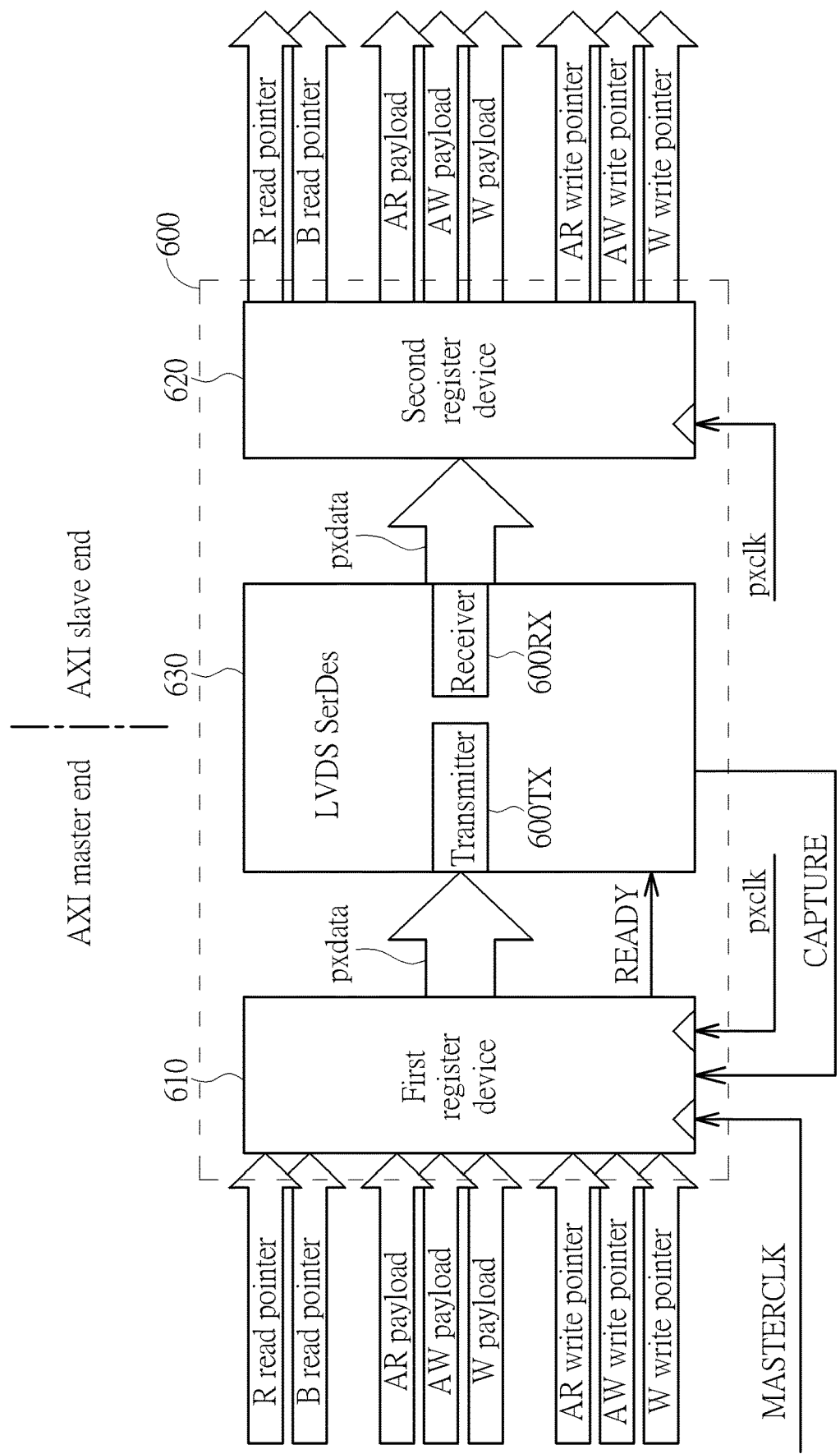
FIG. 7 is a diagram illustrating some details of a connecting device shown in FIG. 6 according to an embodiment of the present invention.

FIG. 7 is a diagram illustrating some details of the connecting device 600 shown in FIG. 6 according to an embodiment of the present invention. FIG. 7 takes the transmitting data $DATA_{TX}$ as an example, where the only difference between the receiving data $DATA_{RX}$ and the transmitting data $DATA_{TX}$ is the data transmission direction thereof, and the rest of the details regarding the receiving data $DATA_{RX}$ may be deduced by analogy according to the example of the transmitting data $DATA_{TX}$. As shown in FIG. 7, the connecting device 600 may comprise a first register device 610, a second register device 620 and a time-division multiplexing (TDM) interface such as a Low Voltage Differential Signaling (LVDS) Serializer/Deserializer (SerDes) 630. In this embodiment, the transmitter 600TX and the receiver 600RX may be embedded in the SerDes 630, but the present invention is not limited thereto. In some embodiments, at least one portion (e.g., a portion or all) of the first register device 610 may be built outside the connecting device 600. For example, at least one portion (e.g., a portion or all) of the first register device 610 may be a portion of the first FPGA $FPGA_A$, but the present invention is not limited thereto. In some embodiments, at least one portion (e.g., a portion or all) of the second register device 620 may be built outside the connecting device 600. For example, at least one portion (e.g., a portion or all) of the second register device 620 may be a portion of the second FPGA $FPGA_B$, but the present invention is not limited thereto.

In this embodiment, the first register device 610 is coupled to the first FPGA $FPGA_A$ and is configured to latch the transmission data $DATA_{TX}$ (which comprises the R read pointer, the B read pointer, the AR payload, the AW payload, the W payload, the AR write pointer, the AW write pointer and the W write pointer that are reordered as mentioned above) from the first FPGA $FPGA_A$ according to a first clock (e.g., a master clock MASTERCLK), where the transmission data $DATA_{TX}$ may be divided into multiple sets of partial data. The LVDS SerDes 630 is coupled between the first register device 610 and the second register device 620, and the LVDS SerDes 630 may transmit the multiple sets of partial data from the first register device 610 to the second register device 620 according to a TDM clock such as a pixel clock pxclk at multiple time points, respectively, where the first FPGA $FPGA_A$ may transmit the master clock MASTERCLK to the connecting device 600, and the connecting device 600 may generate the pixel clock pxclk according to the master clock MASTERCLK. For example, an operating frequency of the first FPGA $FPGA_A$ may be at the level of megahertz (MHz), and a data transmission rate between the transmitter 600TX and the receiver 600RX (e.g., the frequency of the pixel clock pxclk) may reach the level of gigahertz (GHz). Furthermore, the second register device 620 is coupled to the second FPGA $FPGA_B$, and may sequentially receive the multiple sets of data, in order to output the transmission data $DATA_{TX}$ (which comprises the R read pointer, the B read pointer, the AR payload, the AW payload, the W payload, the AR write pointer, the AW write pointer and the W write pointer that are reordered as mentioned above) to the second FPGA $FPGA_B$.

According to the operations mentioned above, the first register device 610 may be regarded as an outbound register file, and the second register device 620 may be regarded as an inbound register file, where any (e.g., either or both) of the first register device 610 and the second register device 620 may comprise multiple registers or multiple static random access memory (SRAM) units, but the present invention is not limited thereto.

In addition, each set of partial data of the multiple sets of partial data may be transmitted from the first register device 610 to the second register device 620 in conjunction with a corresponding identifier (ID) code. After the second register device 620 receives all the multiple sets of partial data, the second register device 620 may recover the transmitting data $DATA_{TX}$ according to the corresponding ID code.

The LVDS SerDes 630 may be an LVDS source synchronous 7:1 SerDes. Assuming that a cable data width of the transmitter 600TX (e.g., the number of connected pins) is 40 bits, a data width of data pxdata received by the LVDS source synchronous 7:1 SerDes is 70×7=280 bits. In this embodiment, 5 bits may be reserved in the data pxdata for being taken as an identifier (ID) code tdm_id, where when tdm_id[4:0] of a set of data is 0, this set of data is regarded as invalid data. Thus, a maximum data width of the transmission data $DATA_{TX}$ is $(280-5) \times (2^5-1) = 8525$ bits. Assuming that $DATA_{TX}$={w_write_pointer, aw_write_pointer, ar_write_pointer, w_payload, aw_payload, ar_payload, b_read_pointer, r_read_pointer} and the data width of $DATA_{TX}$ is 5000 bits, a calculation result of 5000÷(280−5) may indicate that the LVDS SerDes 630 may complete the transmission of the transmitting data $DATA_{TX}$ in 19 transfers, where the transmitting data $DATA_{TX}$ is transmitted starting from a least significant bit (e.g., starting from r_read_pointer), and r_read_pointer, b_read_pointer, ar_payload, aw_payload, w_payload, ar_write_pointer, aw_write_pointer and w_write_pointer may be examples of data values of, respectively, the R read pointer, the B read pointer, the AR payload, the AW payload, the W payload, the AR write pointer, the AW write pointer and the W write pointer mentioned above. In particular, the master clock MASTERCLK and the pixel clock pxclk are asynchronous, where the first register device 610 stores all values of the transmitting data $DATA_{TX}$ at the same time according to the master clock MASTERCLK, and when the first register device 610 has received all values of the transmitting data $DATA_{TX}$ and these values are stable, the first register device 610 may send a signal READY to the LVDS SerDes 630. When the LVDS SerDes 630 receives the signal READY, the LVDS SerDes 630 may start to sequentially transmit respective sets of partial data $DATA_{TX}[m:n]$ from the transmitter 600TX to the receiver 600RX in conjunction with the ID code tdm_id[4:0] in the manner of TDM (e.g., transmitting {tdm_id[4:0], $DATA_{TX}[m:n]$} from the transmitter 600TX to the receiver 600RX in the manner of TDM), where m and n are positive integers, and m−n=275−1, which means a data width of each set of partial data $DATA_{TX}[m:n]$ may be 275. For example, in a first cycle of the pixel clock pxclk, pxdata={5'd1, $DATA_{TX}[274:0]$}; in a second cycle of the pixel clock pxclk, pxdata={5'd2, DATA$_{TX}$[549:275]}; and deduced by analogy, in a 19$^{th}$ cycle of the pixel clock pxclk, pxdata={5'd19, 225d'0, DATA$_{TX}$[4999:4950]}; where if no data needs to be transmitted (e.g., the whole transmitting data DATA$_{TX}$ has been transmitted), pxdata=280'd0. Thus, the second register device 620 may sequentially latch the multiple sets of partial data (which is transmitted based on the pixel clock pxclk) according to the pixel clock pxclk. Note that x'dy mentioned above is configured to illustrate a decimal number y by an x-bit binary number for brevity.

According to the example mentioned above, the AXI slave end (e.g., the second register device 620 or the second FPGA FPGA$_B$) may refer to the ID code carried by the data pxdata in respective cycles of the pixel clock pxclk, in order to know how to recover the transmitting data DATA$_{TX}$ according to the data pxdata in respective cycles of the pixel clock pxclk. Once the transmitting data DATA$_{TX}$ has been transmitted, the LVDS SerDes 630 may send a signal CAPTURE to the first register device 610, and the first register device 610 can update the data values stored therein after receiving the signal CAPTURE (e.g., receiving a next set of data that needs to be transmitted from the first FPGA FPGA$_A$).

In addition, an entirety of any of the at least one read pointer and the at least one write pointer is comprised in the same set of partial data among the multiple sets of partial data. For example, transmission of any (e.g., each) of the R read pointer, the B read pointer, the AR write pointer the AW write pointer and the W write pointer may be completed within one cycle of the pixel clock pxclk, and data values of any (e.g., each) pointer will not be separated into multiple cycles of the data pxdata for transmission. As each pointer at the AXI slave end will not be segmented, data transmission error caused by abnormal update of the FIFO status can be avoided. Furthermore, by the configuration of the transmission order mentioned above (e.g., the configuration of making the time point of the at least one payload being transmitted be earlier than the time point of the at least one write pointer being transmitted), it can be guaranteed that the second register device 620 (e.g., the asynchronous FIFOs therein) can properly perform data transmission on the AXI channels.

In this embodiment, a maximum set count of the multiple sets of partial data is determined by a bit count of the corresponding ID code. For example, when the corresponding ID code comprises N bits, it means the transmitting data DATA$_{TX}$ can be divided into (2^N−1) sets of partial data at most, and the (2^N−1) sets of partial data is sequentially transmitted at (2^N−1) cycles of the pixel clock pxclk. Thus, a TDM ratio of the LVDS SerDes 630 corresponds to the bit count of the ID code mentioned above.

In some embodiments, in addition to the aforementioned ID code, one or more bits may be reserved for a corresponding check code in the data pxdata. Thus, each set of partial data of the multiple sets of partial data may be transmitted from the first register device 610 to the second register device 620 in conjunction with a corresponding check code (e.g., the data pxdata transmitted at each cycle of the pixel clock pxclk may comprise one or more bits configured to carry the corresponding check code), and the corresponding check code may be configured to perform error detection, error correction or data retry of said each set of partial data.

In some embodiments, pipe register(s) may be inserted into any position of a transmission path of the data pxdata (e.g., a path between the transmitter 600TX and the receiver 600RX), in order to ensure timing of an overall system without impacting an overall function. In addition, the present invention taking the AXI bus protocol as an example is for illustrative purposes only, and is not intend to be a limitation of the present invention. For example, the inter FPGAs data transmission mechanism mentioned above is also applicable to other point-to-point transmission protocols such as open core protocol (OCP) or Advanced Microcontroller Bus Architecture (AMBA).

Figure 8:
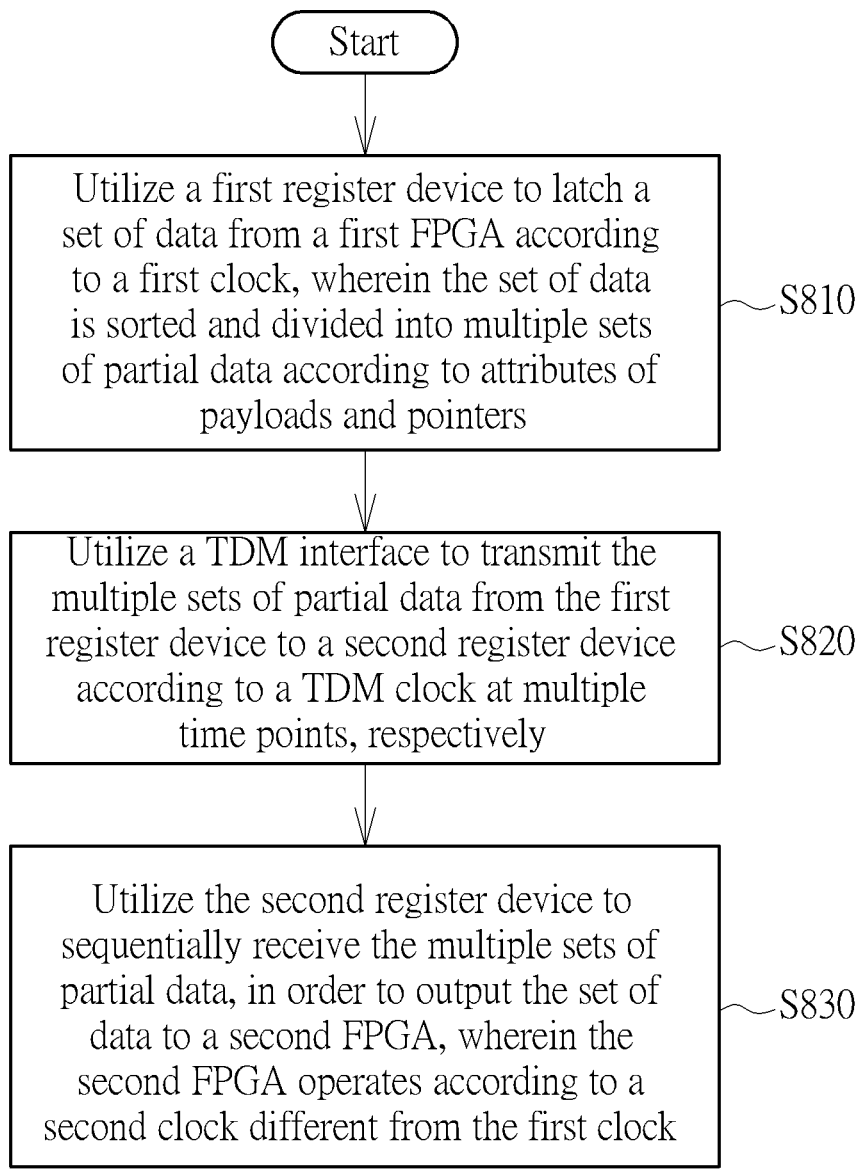
FIG. 8 illustrates a working flow of a method for performing data transmission control of inter FPGAs according to an embodiment of the present invention.

FIG. 8 illustrates a working flow of a method for performing data transmission control of inter FPGAs according to an embodiment of the present invention, where the working flow is applicable to the apparatus 60 shown in FIG. 6 and the connecting device 600 therein. It is noted that, as long as an overall result is not hindered, one or more steps may be added, modified or deleted in the working flow shown in FIG. 8, and these steps do not have to be executed in the exact order shown in FIG. 8.

In Step S810, the apparatus 60 may utilize the first register device 610 to latch a set of data (e.g., the transmitting data DATA$_{TX}$) from a first FPGA FPGA$_A$ according to a first clock (e.g., the master clock MASTERCLK), where the set of data is sorted and divided into multiple sets of partial data (e.g., DATA$_{TX}$[274:0], DATA$_{TX}$[549:275], . . . , and DATA$_{TX}$[4999:4950] mentioned above) according to attributes of payloads and pointers.

In Step S820, the apparatus 60 may utilize a TDM interface (e.g., the LVDS SerDes 630) to transmit the multiple sets of partial data from the first register device 610 to the second register device 620 according to a TDM clock (e.g., the pixel clock pxclk) at multiple time points (e.g., multiple cycles of the pixel clock pxclk), respectively.

In Step S830, the apparatus 60 may utilize the second register device 620 to sequentially receive the multiple sets of partial data, in order to output the set of data to the second FPGA FPGA$_B$, where the second FPGA FPGA$_B$ operates according to a second clock different from the first clock.

To summarize, the method and associated apparatus provided by the embodiment of the present invention can utilize bus flow control and master-slave mechanism with the aid of a source synchronous SerDes interface (which has the features/advantages of high speed transmission), in order to completely separate different clock domains of the FPGAs. As a result, these FPGAs can operate under their own optimized frequencies without being affected by the operating frequency of the TDM and/or the TDM ratio. More particularly, by controlling the bit count of the ID code, IO sharing of these FPGAs can be more flexible in response to increasing of the data width. Furthermore, as long as mechanisms of a master end and a slave end of the source synchronous SerDes interface are matched, the inter FPGAs transmission control mechanism mentioned above is also applicable to data transmission of chip-to-chip or chip-to-FPGA. In comparison with the related art, the embodiments of the present invention will not greatly increase additional costs. Thus, the present invention can solve the problem of the related art without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing data transmission control of inter field programmable gate arrays (FPGAs), comprising:
utilizing a first register device to latch a set of data from a first FPGA according to a first clock, wherein the set of data is sorted and divided into multiple sets of partial data according to attributes of payloads and pointers;

utilizing a time-division multiplexing (TDM) interface to transmit the multiple sets of partial data from the first register device to a second register device according to a TDM clock at multiple time points, respectively; and utilizing the second register device to sequentially receive the multiple sets of partial data, in order to output the set of data to a second FPGA, wherein the second FPGA operates according to a second clock different from the first clock.

2. The method of claim 1, wherein data transmission between the first FPGA and the second FPGA comprises multiple channel types, each channel type of the multiple channel types comprises transmission of data in two directions, and the set of data is generated by sorting data in the same direction among the multiple channel types.

3. The method of claim 1, wherein according to data attributes, the set of data comprises at least one read pointer, at least one payload or at least one write pointer.

4. The method of claim 1, wherein each set of partial data of the multiple sets of partial data is transmitted from the first register device to the second register device in conjunction with a corresponding identifier (ID) code, and after the second register device receives all of the multiple sets of partial data, the second register device recovers the set of data according to the corresponding ID code.

5. The method of claim 1, wherein each set of partial data of the multiple sets of partial data is transmitted from the first register device to the second register device in conjunction with a corresponding check code, and the corresponding check code is configured to perform error detection, error correction or data retry of said each set of partial data.

6. The method of claim 3, wherein an entirety of any of the at least one read pointer and the at least one write pointer is comprised in the same set of partial data among the multiple sets of partial data.

7. The method of claim 3, wherein a time point of the at least one payload being transmitted from the first register device to the second register device is earlier than a time point of the at least one write pointer being transmitted from the first register device to the second register device.

8. The method of claim 4, wherein a maximum set count of the multiple sets of data is determined by a bit count of the corresponding ID code.

9. The method of claim 7, wherein a time point of the at least one read pointer being transmitted from the first register device to the second register device is earlier than a time point of the at least one payload being transmitted from the first register device to the second register device.

10. An apparatus for performing emulation of an electronic system, comprising:
a first field programmable gate array (FPGA), configured to perform emulation of a first sub-system of the electronic system, wherein the first FPGA operates according to a first clock;
a second FPGA, configured to perform emulation of a second sub-system of the electronic system, wherein the second FPGA operates according to a second clock different from the first clock;
a first register device, coupled to the first FPGA;
a second register, coupled to the second FPGA; and
a time-division multiplexing (TDM) interface, coupled between the first register device and the second register device;
wherein the first register device latches a set of data from the first FPGA according to the first clock; the set of data is sorted and divided into multiple sets of partial data according to attributes of payloads and pointers, to allow the TDM interface to transmit the multiple sets of partial data from the first register device to the second register device according to a TDM clock at multiple time points, respectively; and the second register device sequentially receives the multiple sets of partial data, in order to output the set of data to the second FPGA.

11. The apparatus of claim 10, wherein data transmission between the first FPGA and the second FPGA comprises multiple channel types, each channel type of the multiple channel types comprises transmission of data in two directions, and the set of data is generated by sorting data in the same direction among the multiple channel types.

12. The apparatus of claim 10, wherein according to data attributes, the set of data comprises at least one read pointer, at least one payload or at least one write pointer.

13. The apparatus of claim 10, wherein each set of partial data of the multiple sets of partial data is transmitted from the first register device to the second register device in conjunction with a corresponding identifier (ID) code, and after the second register device receives all of the multiple sets of partial data, the second register device recovers the set of data according to the corresponding ID code.

14. The apparatus of claim 10, wherein each set of partial data of the multiple sets of partial data is transmitted from the first register device to the second register device in conjunction with a corresponding check code, and the corresponding check code is configured to perform error detection, error correction or data retry of said each set of partial data.

15. The apparatus of claim 12, wherein an entirety of any of the at least one read pointer and the at least one write pointer is comprised in the same set of partial data among the multiple sets of partial data.

16. The apparatus of claim 12, wherein a time point of the at least one payload being transmitted from the first register device to the second register device is earlier than a time point of the at least one write pointer being transmitted from the first register device to the second register device.

17. The apparatus of claim 13, wherein a maximum set count of the multiple sets of data is determined by a bit count of the corresponding ID code.

18. The apparatus of claim 16, wherein a time point of the at least one read pointer being transmitted from the first register device to the second register device is earlier than a time point of the at least one payload being transmitted from the first register device to the second register device.

* * * * *